April 5, 1960 L. C. MURRAY 2,931,077
MOBILE HOME CONSTRUCTION
Filed March 13, 1956 8 Sheets-Sheet 1

INVENTOR.
Loren C. Murray
BY
Charles Marshall Hogan
ATTORNEY.

April 5, 1960     L. C. MURRAY     2,931,077
MOBILE HOME CONSTRUCTION
Filed March 13, 1956     8 Sheets-Sheet 3

INVENTOR.
Loren C. Murray
BY
Charles Marshall Hogan
ATTORNEY.

April 5, 1960

L. C. MURRAY 2,931,077

MOBILE HOME CONSTRUCTION

Filed March 13, 1956

INVENTOR.
Loren C. Murray
BY
Charles Marshall Hogan
ATTORNEY.

April 5, 1960

L. C. MURRAY 2,931,077

MOBILE HOME CONSTRUCTION

Filed March 13, 1956

INVENTOR.
Loren C. Murray
BY
Charles Marshall Hogan
ATTORNEY.

United States Patent Office 2,931,077
Patented Apr. 5, 1960

2,931,077

MOBILE HOME CONSTRUCTION

Loren C. Murray, Lafayette, Ind.

Application March 13, 1956, Serial No. 571,204

9 Claims. (Cl. 20—2)

The present invention relates to and provides a novel construction for mobile homes.

In the mobile home industry "job shop" construction practices are universal, so that the typical prior art trailer or mobile home is constructed with a framework consisting of joists, studs, braces and plates, to which framework, through traditional carpentry practices, plywood is nailed in finishing the interior. Superimposed on this conventional wood structure is an exterior metal skin. Construction methods of this type have been employed during twenty years of establishment and successful growth of this industry. Although several hundred enterprises are now engaged in the manufacture of trailers, including more than sixty members of the trade association, many of the advantages of standardized components and processing methods have not been realized. One of the broad objects of the invention is to provide a construction which exploits the advantages of standardization and at the same time is sufficiently flexible to permit each manufacturer to express its own competitive individuality with respect to over-all size, ornamental thesis and special features.

The impetus given to the mobile home industry by the large volume of capital construction in rural and suburban areas, by the migration of workers and retired persons, by critical housing shortages in military and defense products manufacturing areas, and by other factors, has brought to public attention a number of material disadvantages of prior art mobile home constructions. For example, a particularly acute problem is presented by condensation of water and by leakage causing substantial accumulations of water internally of the framework and in the regions between interior and exterior walls or between the outer metallic skin and the wooden structure. Prior art structures do not adequately prevent the damage to the interior commonly caused by such accumulations nor are such structures adapted to exploit waterproof methods of bonding. One object of the present invention is to provide a novel structure characterized by a combination of features which cooperatively facilitate the free passage, evaporation and discharge of moisture.

Another significant disadvantage of prior art constructions is the absence of rigid interlock among the various structural members. In conventional mobile homes the structural members do not provide support for each other and, in the aggregate, they impress a substantial dead weight on the under-carriage, causing observable sagging. Another object of the invention is to provide a construction which features interlocking of panels and staggering of joints and weather sealing of components in such a way that a particularly rigid structure results. A further advantage of the invention is that this novel structure does not depend on interior partitions for adequacy of strength.

Conventional mobile homes are not readily repaired or replaced after the occurrence of accidents on the road, as by side-swiping. Accordingly, a further object of the invention is to provide a structure which, when damaged, can be economically and rapidly repaired.

Fundamentally, it is an object of the invention to provide a construction which satisfies requirements peculiar to mobility, is adapted for standardization, and is particularly strong and rigid.

While in conventional structures it is necessary to use nails, screws, and other unsightly wood fastening devices on the interior wall or ceiling, an object of the present invention is to dispense with same.

For a better understanding of the present invention, together with other and further objects, advantages and capabilities thereof, reference is made to the following description of the accompanying drawings, in which there is shown a preferred illustrative embodiment of the invention. A practical working model in accordance with the embodiment disclosed herein has been constructed and road tested, under the applicant's direction, and has been found to accomplish the objectives hereinabove mentioned and to realize other advantages which will be pointed out as the description proceeds.

Figure 1:
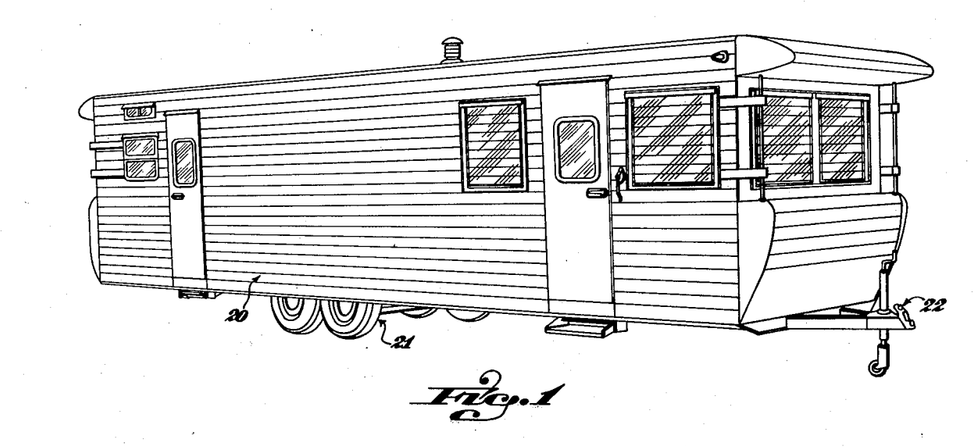
Fig. 1 is a perspective view, taken from a mainly lateral and slightly frontal aspect, showing a mobile home manufactured in accordance with the present invention, Fig. 1 being the only view showing the exterior aluminum skin in place.
Figure 2:
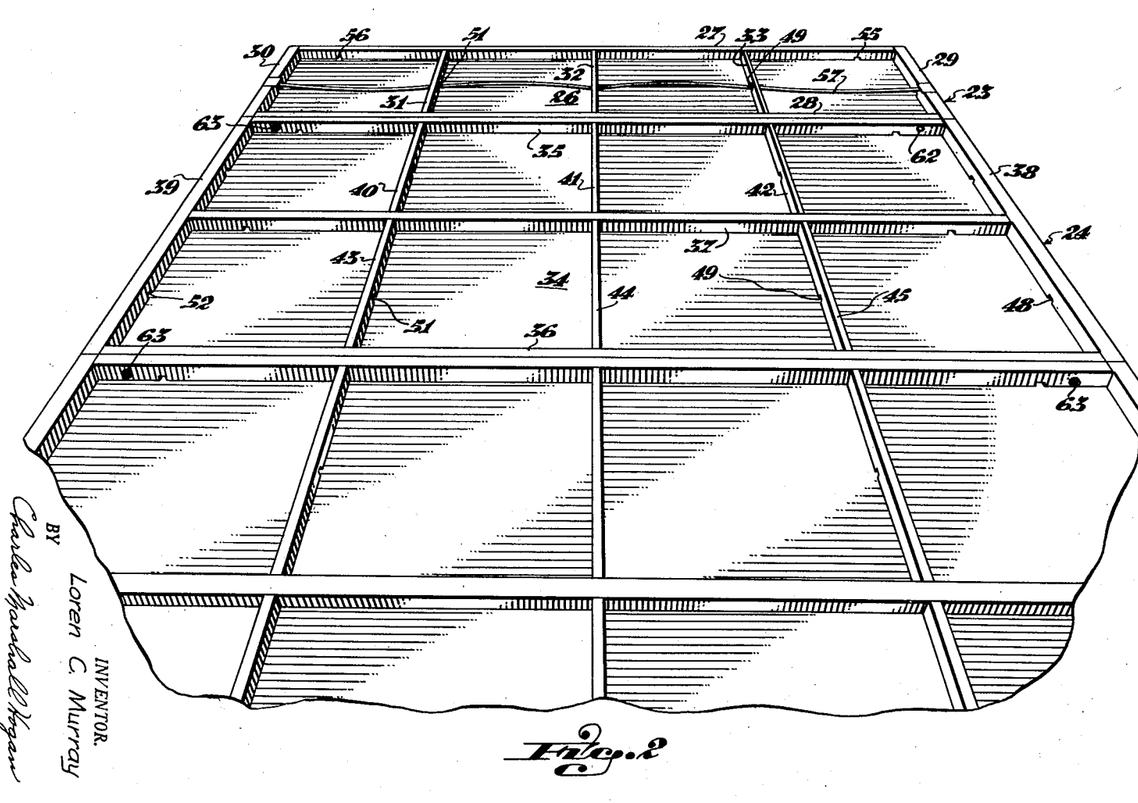
Fig. 2 is a perspective view, taken form a point of observation above the mobile home and looking toward the rear, showing a portion of the roof of my novel mobile home.
Figure 8:
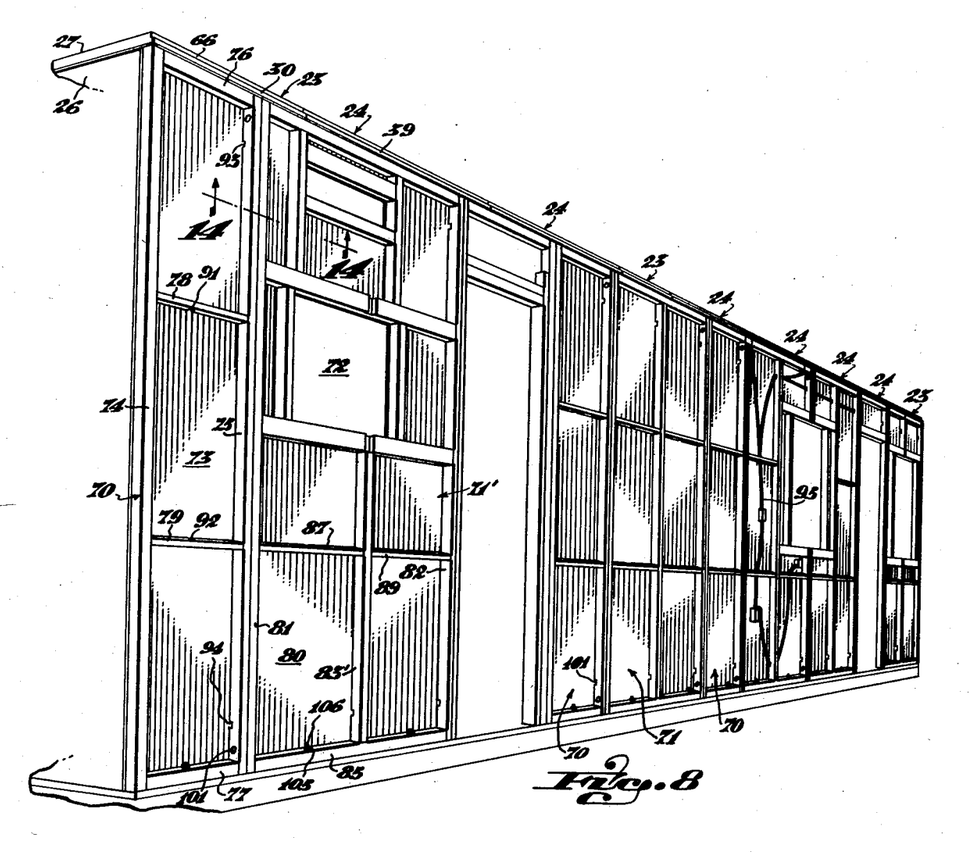
Fig. 8 is a perspective view of the right side (looking toward the front) of the mobile home structure, taken from a point of view which is generally lateral and slightly to the rear, showing the interlocking side panel units and other features described below.
Figure 9:
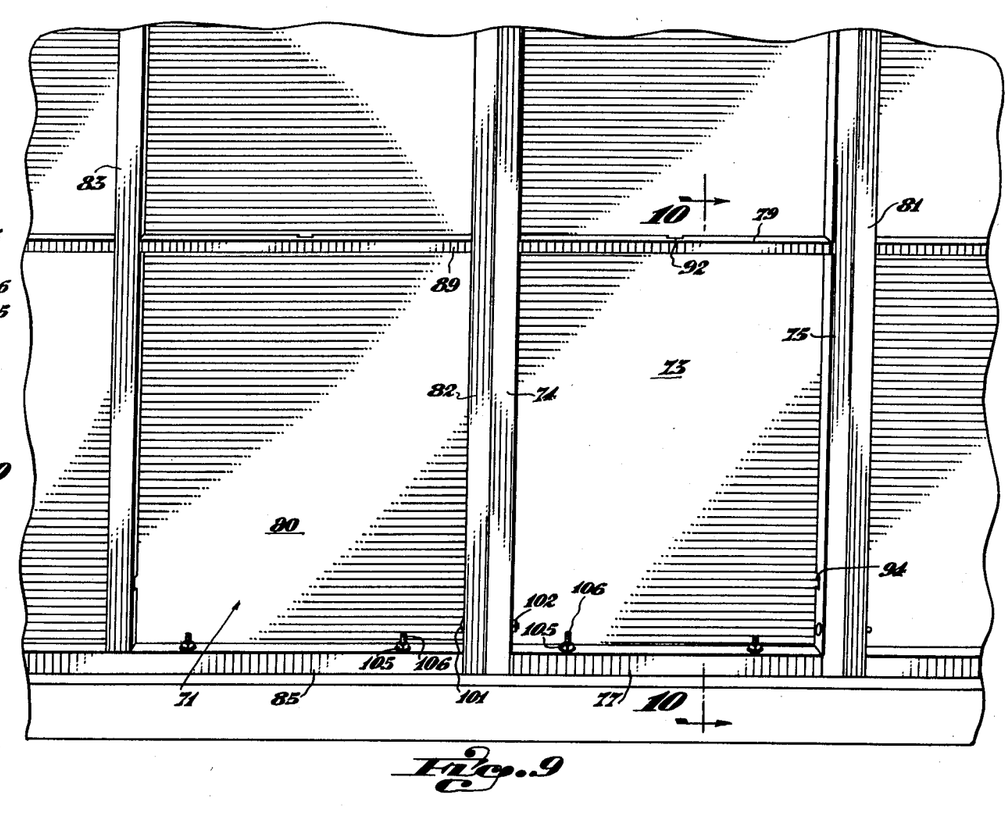
Fig. 9 is an enlarged side elevational view of the exterior portion of the side structure.
Figure 10:
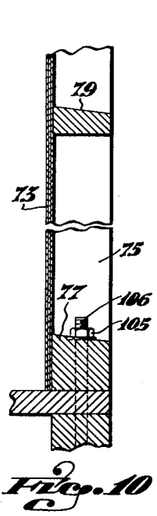
Fig. 10 is a cross-sectional view taken along the section line 10—10 of Fig. 9 and looking in the direction of the arrows.
Figure 15:
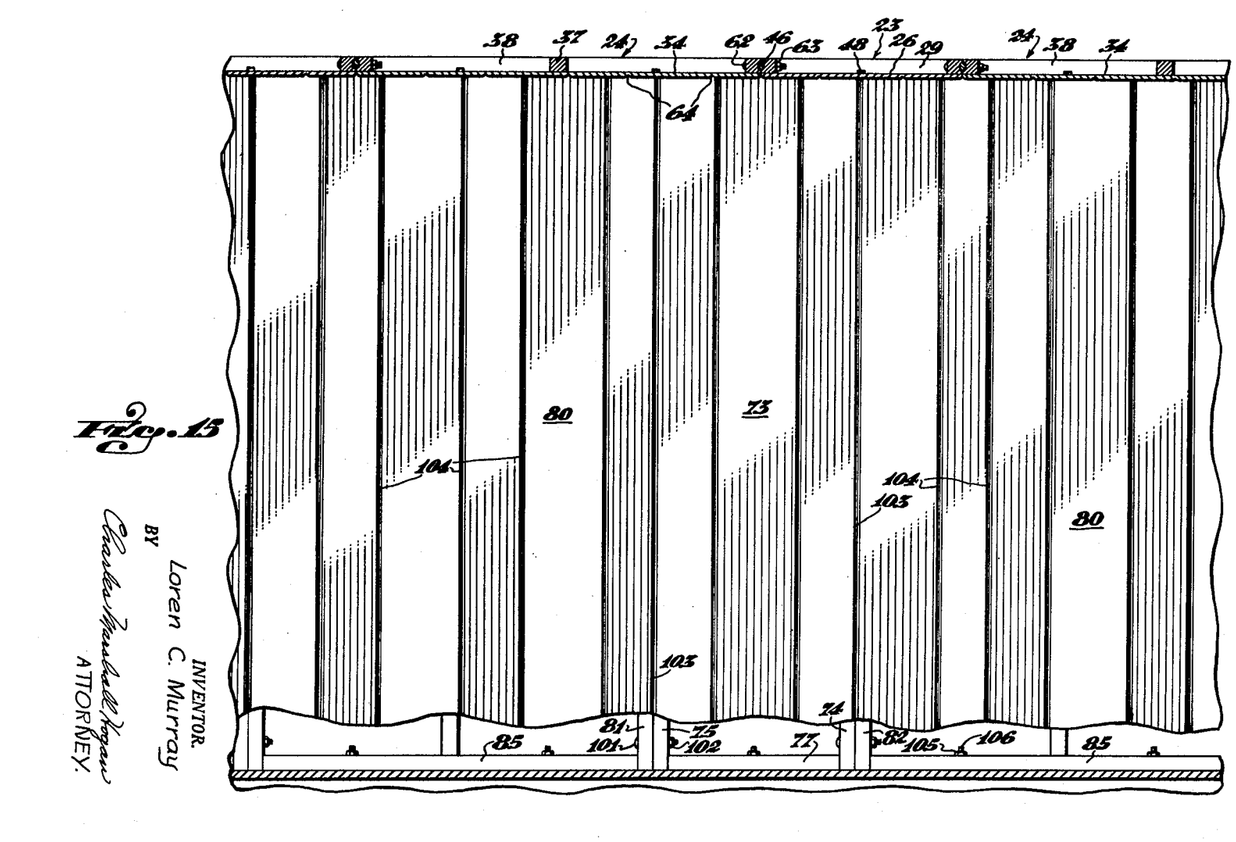
Fig. 15 is a fragmentary interior view of the side of my mobile home structure.

Referring now briefly to Fig. 1, the exterior appearance of the mobile home there illustrated may be dictated by the preference of the individual manufacturer. The internal structure provided by the invention constitutes a radical departure from conventional doctrine. Nonetheless, standardization of components and processing of structure is reconciled with latitude in styling. This mobile home comprises the usual aluminum exterior skin 20, under-carriage 21, hitch 22, and the novel basic construction now to be described. The roof exterior of this structure is illustrated in Fig. 2 and one of the two generally similar side exteriors is shown in Fig. 8. A typical portion of the interior is illustrated in Fig. 15, and general attention is first invited to these three views.

Referring now specifically to Fig. 2, the roof structure there illustrated comprises a plurality of interlocking roof panel units 23 and 24. Unit 23 consists of a main rectangular plywood panel member 26, extending entirely across the mobile home structure, a pair of wood side rails 27 and 28, and wood cross rails 29, 30, 31, 32 and 33, the first two (i.e. 29—30) of which cross rails lap and are secured to the termini of the side rails and the latter three of which are symmetrically secured intermediate rails 29 and 30 with their termini in abutment with the side rails, forming butt joints. The plywood panel is waterproof-bonded to the undersides of all rails in the unit.

Unit 24 is generally similar to roof panel unit 23 except that it is approximately of double width. Unit 24 comprises a main rectangular plywood panel 34, a pair of side rails 35 and 36, a center rail 37, and principal cross rails 38 and 39, the cross rails lapping and being secured to the ends of the side rails 35 and 36. Symmetrically spaced intermediate the cross rails 38 and 39 are cross rails 40, 41 and 42, the ends of each of which abut side rail 35 and center rail 37. Similarly there are provided cross rails 43, 44 and 45, the ends of which abut center rail 37 and side rail 36.

The roof structures may be made to fit a wide range of over-all dimension requirements by various permutations of single and double roof panel units. Various widths and lengths of standardized units afford wide latitude in manufacturing trailers of various widths and lengths.

Figures 3, 4, 5, 6, 7:
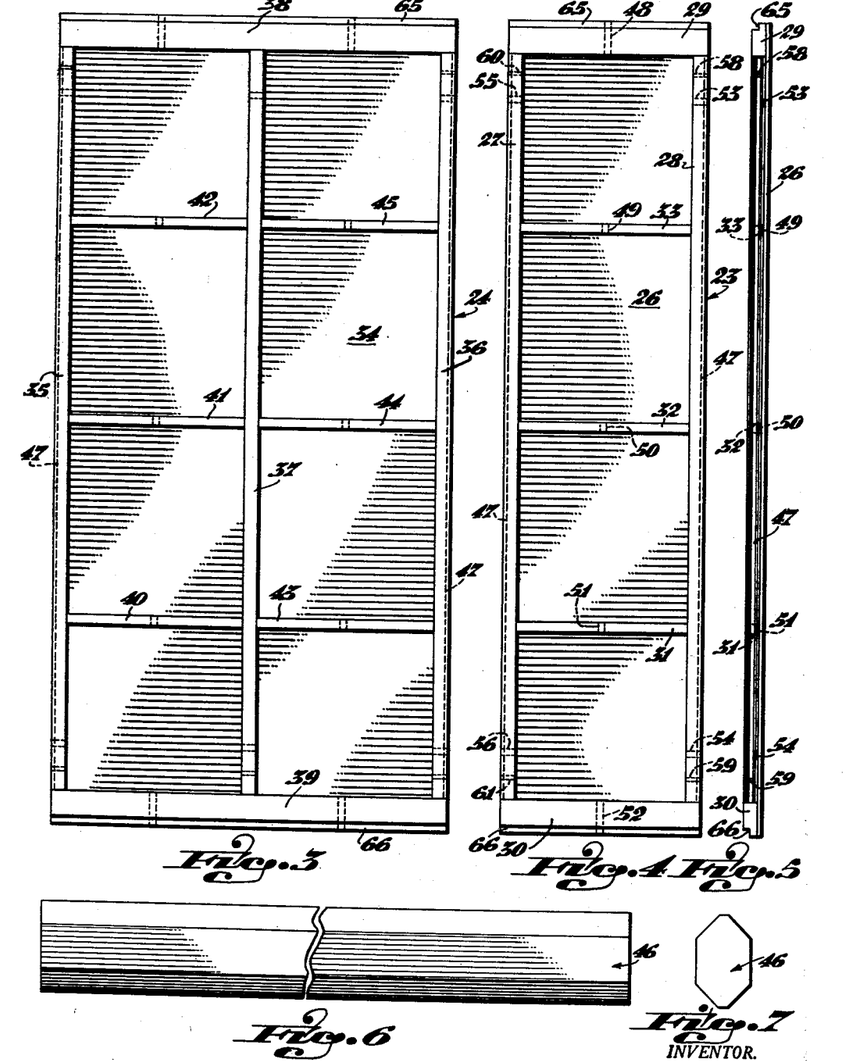
Figs. 3 and 4 are plan views of two types of units utilized in the Fig. 2 roof structure.
Fig. 5 is an end elevational view of the Fig. 4 roof panel unit.
Fig. 6 and Fig. 7 are side and elevational views showing a suitable spline, utilized in the interlocking of the roof panels.

Referring now generally to Figs. 3, 4, and 5, a double roof panel unit is illustrated in Fig. 3 and a single roof panel unit in Fig. 4. Fig. 5 is an adequate end elevational view of either roof panel unit. The abutting faces of the adjacent side rails, such as rails 28 and 35, for example, are grooved at 47 (by analogy to Fig. 14) so that the abutting side rails embrace and clutch an octagonal wood spline 46, shown in detail in Figs. 6 and 7. Each side rail of each roof panel is grooved for this purpose, as illustrated at 47 in Fig. 5. The spline 46 is coextensive in length with the side rails. A spline may be permanently fastened to a side rail of each panel in order to facilitate final assembly. A typical joint of roof panels featuring spline 46 is illustrated at the top of Fig. 15.

One of the features of my construction is the provision of notches or dado cuts 48, 49, 50, 51 and 52 on the cross rails. All of these cuts are shown and numbered in Fig. 4 and all are also shown in Fig. 2 wherein one is designated by the reference numeral 49.

These dado cuts are made immediately adjacent the main panel. The side rails are similarly notched as indicated by the reference numerals 53, 54, 55 and 56 (Fig. 4).

The significant advantages now discussed accrue from the provision of these notches. Let us consider those numbered 48—52. Plywood panels inherently are slightly bowed with the concavity on the interior face of the panel. This factor imparts an inherent upward bow to the roof and such geometry causes moisture to be discharged outwardly toward the sides through the notches 48—52. Additionally such notches facilitate the permanent securing of wiring 57 (Fig. 2), the cable being laid through the notches. The similar notches 53—56 facilitate the free passage of moisture and are preventative of water accumulations. They likewise are available for placement of wiring.

As shown in Figs. 2 and 3, the side and center and cross rails of the double roof panel units are notched in a similar manner for the same purpose.

Let us now consider further the interlocking of the roof panel units. In side rail 28, for example (Fig. 4), near its extremities, there are drilled ports 58 and 59. Similarly, in side rail 27 there are drilled ports 60 and 61. The double and single roof panel units are similarly provided with ports as specifically illustrated in Figs. 3 and 4. Rigid interlock between adjacent roof panel units is effected, not only by the bonding and clutching action of spline 46 but also by a plurality of clamping actions such as that provided by bolt 62, projecting through the registering ports of abutting side rails and nut 63 (Fig. 2). The sectional view of a typical roof interlock is indicated by the reference numerals 26, 34, 46, 62 and 63, in Fig. 15. It will be understood that those reference numerals are generally applicable to any interlock between a double unit roof panel and a single unit roof panel and that such interlock is in turn identical to the interlock between single unit roof panels or between double unit roof panels, the reference numerals of Fig. 15 being typical.

Again considering Fig. 15, it will be seen that this interlock of adjacent panels provides an extremely rigid and substantial construction. Additionally, the interior roof panels 26 and 34 are in continuity, abutting with a slight groove formed by their abutting partially beveled edges. An advantage of this construction is that interior wood fastenings are dispensed with and a harmonious interior ornamental theme can be effected by the cutting of random grooves 64 (Fig. 15) in the roof panels. As will be seen, rigidity of construction is enhanced by the staggering of the roof and side interlocks. Fig. 15 shows this feature. Each interlock between roof panels is advantageously horizontally displaced relative to the nearest interlock between side panel units, thereby enhancing the rigidity of the ensemble so that each panel unit tends to support others. In other words, roof panel interlock extremities are adjacent to solid cross rails of the side panel units, and side panel unit interlocks are adjacent solid cross rails of the roof panel units. The spline recess 47 on each side rail (Figs. 3–5) is preferably calked or coated with glue before the interlock is effected, thereby producing a weather sealing.

This construction is appropriate fully to exploit the advantages of waterproof bonding of the plywood to the rails. The utilization of this particularly advantageous bonding expedient, in addition to the dado cuts and bowing mentioned above, provides unique insurance against water damage.

Optionally, the outer cross rails of the roof units may be quarter-notched as shown at 65 and 66 (Fig. 5) to facilitate security for a choice of curved or angled roof edges.

The description now proceeds to Figs. 8–13, the principles of which and many of the details of which will now be fully understood in the light of their general similarity to the roof construction just described in detail.

Figure 11:
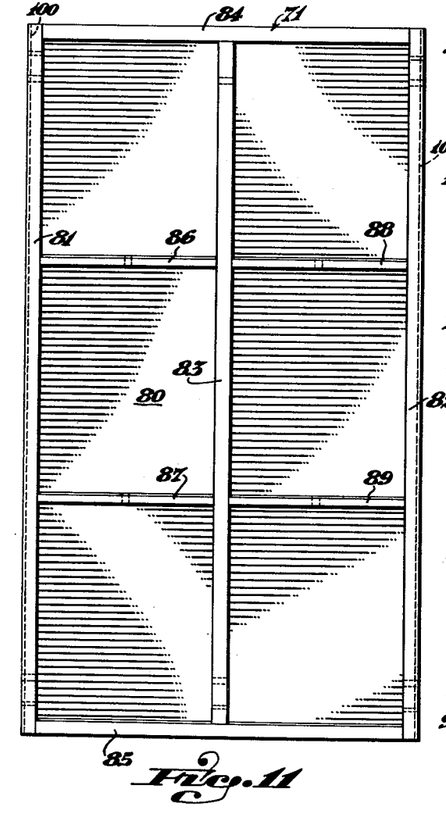
Figs. 11 and 12 are plan views of two types of side panel units utilized in the Fig. 8 structure.

Referring now specifically to Fig. 8, this side structure is illustrative and it will be understood that the left and right sides of the trailer are generally similar except for variations with respect to whatever desired locations of windows and doors may be involved. The side structure comprises a plurality of single panel units 70 and double panel units. One double side panel unit shown in Fig. 8 is designated by the reference numeral 71' because of the fact that it has been in part cut away, altered and otherwise tailored to provide for windows, a typical window opening being illustrated at 72. A typical double panel as used without such alteration in other portions of the side of the trailer is designated by the reference numeral 71 and is shown in Fig. 11.

If desired, standard side panel units in accordance with the invention may be suitably dimensioned and utilized for that portion of the side which lies below window opening 72, for example, reducing carpentry work at the assembly plant.

Unit 70 (Fig. 12) consists of a main panel member 73, made of plywood, extending over substantially the entire height of the mobile home structure, a pair of side rails 74 and 75, and cross rails 76, 77, 78 and 79, the first or outer two of which abut the end margins of the side rails and the latter two of which cross rails are symmetrically disposed intermediate the outer cross rails with their termini in abutment with each side rail. Again, the plywood panel is bonded to the rigid framework provided by the rails.

Unit 71 (Fig. 11) is generally similar to unit 70 except that it is approximately of double width. Unit 71 comprises a main panel 80, a pair of side rails 81 and 82, a center rail 83 (designated 83' in Fig. 8 to indicate the alteration appropriate for the window), and cross rails 84 and 85, the cross rails abutting and being secured to the margins of the side rails 81 and 82. Symmetrically spaced intermediate the cross rails 84 and 85 are cross rails 86 and 87, the ends of which abut side rail 81 and center rail 83. Similarly there are provided cross rails 88 and 89, the ends of which abut center rail 83 and side rail 82.

Figures 12, 13:
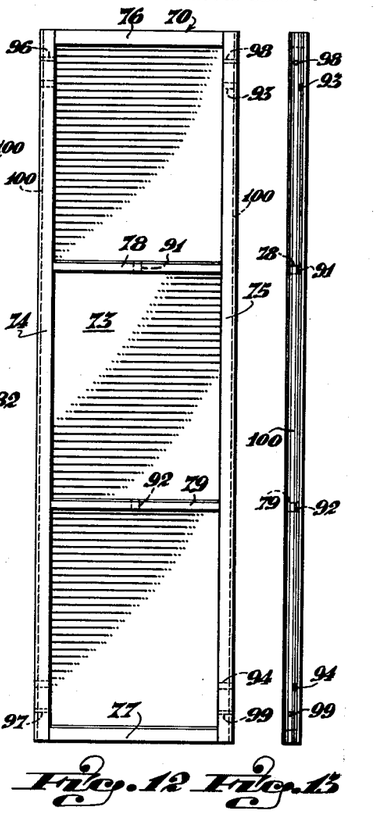
Fig. 13 is an end elevational view of the Fig. 12 panel unit.

Fig. 13 is an adequate end elevational view of either side panel unit. The abutting faces of the adjacent side rails of adjoining units, involving such rails as 75 and 81, for example, are grooved, as shown at 100 in Fig. 14, so as to embrace and clutch an octagonal spline 90, generally similar to the Fig. 6–7 spline. Each side rail of each side panel is grooved for this purpose. The spline 90 is coextensive in length with the side rails and may be permanently bonded to one side rail of each panel in order to facilitate assembly, forming a tongue on that side rail, which is complementary to and is received by the recess or groove in the side rail of the adjacent panel.

In furtherance of a feature of my construction previously mentioned is the provision of notches or dado cuts 91 and 92 on the cross rails (Fig. 12). These dado cuts are made immediately adjacent the main panel. The side and center rails are similarly notched at points near their ends as indicated by the reference numerals 93 and 94. As previously stated, roof notches facilitate the free passage of moisture outwardly and downwardly and provide further insurance against undesired water accumulation. On the other hand, the principal purpose of the notches in the side panel rails is to facilitate placement of wiring as shown at 95 (Fig. 8).

Figure 14:
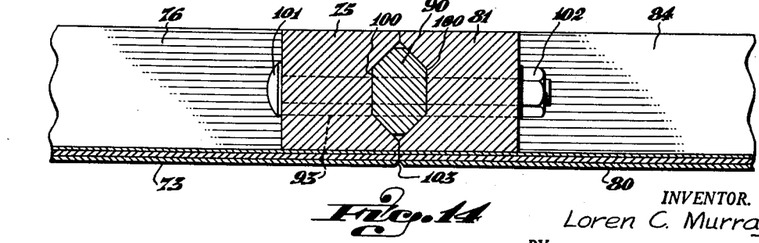
Fig. 14 is a cross-sectional view illustrating a spline used in the side wall construction and a typical interlock between two side panel units, this view being taken along section line 14—14 of Fig. 8.

Coming now to a further description of the interlocking of the side panel units, side rails 74 and 75 are drilled at their extremities to provide ports 96, 97, 98 and 99. The double and single side panel units are similarly provided with dado cuts and ports as specifically illustrated in Figs. 11 and 12. Rigid interlock between adjacent wall panel units is effected, not only by the bonding and embrace of spline 90 but also by a plurality of fasteners. One such fastener comprises bolt 101, projecting through registered ports, and nut 102 (Fig. 14). The side view of a typical side interlock is indicated by the reference numerals 81, 75, 101 and 102 in Fig. 15. It will be understood that those reference numerals are generally applicable to any interlock between a double unit side panel and a single unit side panel, which interlock is in turn identical to the interlock between single unit side panels or between double unit side panels.

As further shown in Figs. 14 and 15, the interior side panels are in continuity, the partially beveled edges abutting with a slight groove 103. Fig. 15 in particular, being partly broken away to facilitate description, shows the combination of features by which interior wood fastenings are dispensed with and a pleasing finished interior appearance presented. The harmonious interior and decorative effect can be enhanced by the cutting of random grooves 104 in the side panels. Again, note is made of the desirability of horizontally staggering, displacing of the junction of side panels relative to the nearest junction of roof panel units. Further, the spline recess 100 on each side rail of the side panel units is suitably treated to effect a weather seal.

In furtherance of the objective of eliminating moisture conditions, the intermediate cross rails and lower cross rail (Fig. 10) are formed with top surfaces having a slightly downward and outward, tapering, facilitating flow-off.

The side construction is of equal utility in making the front and back of the mobile home, which need not be further discussed herein.

The entire structure is rigidly secured to the supporting bed as by a plurality of foundation bolts 106 and nuts 105, the bolts projecting through ports in the bottom cross rails to the floor structure.

The top structure is nailed directly to the side structure in the manner indicated in Fig. 8 in which the cross rail 30 of the rear roof panel unit abuts and is secured to the cross rail 76 of the rear side panel. Securing the roof structure to the side structure in this manner is shown as illustrative.

Figure 16:
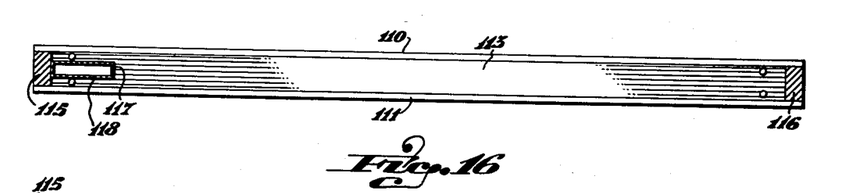
Fig. 16 is an end view of a floor structure in accordance with the invention.
Figure 17:
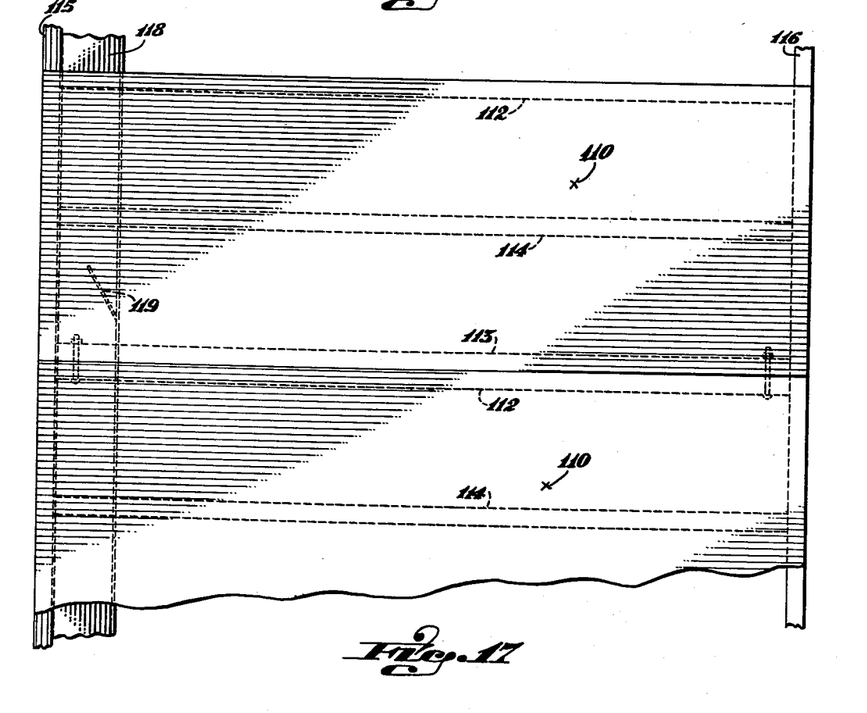
Fig. 17 is a fragmentary plan view of the floor structure.

Referring now specifically to Figs. 16 and 17, there is shown a form of floor structure in accordance with one aspect of the invention. This floor structure comprises panel units, each of which has a top plywood panel 110, a bottom plywood panel 111, and side rails 112 and 113. Each panel 110 extends entirely across the mobile home so that the bed may be made up of a plurality of these panel units, joined by the spline and clamping features described in detail, as for the roof and side units.

Disposed intermediate the side rails is an additional rail 114.

The rails do not extend entirely across the width of the panels 110 and 111, but margins are left at each end so that further security for the floor structure is afforded by main structure members 115 and 116 which extend across several panel units and further secure them in a rigid floor structure.

As shown in Fig. 16, a rectangular opening 117 is provided in each side rail to permit the passage of a metallic heat duct 118. This duct includes the usual baffles 119, placed where desired. An advantageous feature of this structure, in addition to its rigid assembly, is the flexibility of heat outlets which it facilitates, and the ready placement of the heat duct.

The invention having been described above, other advantages will now be apparent to those skilled in this art. Flexibility of window and door placement can be accomplished by variation in panel size. In the process of manufacture, wall and roof jigs may be eliminated or greatly simplified. The advantages of this construction from the standpoint of standardization and quality control of manufacturing processes are apparent. Since the interior panels abut in continuity the interior surfaces may be prefinished. Job shop handling and cutting of structural members for individual trailers is minimized. Handling of lumber and disposal of unusable lumber are reduced. With the use of this structure the efficiency of assembly operations and volume manufacturing can be accomplished. The random grooving feature shown above dispenses with the application of decorative molding to cover interior joints. Since interior partitions are not relied on in this construction for rigidity they can be dispensed with where desired. Further, each cross member of the side panel units is advantageously located to provide a base to which to secure the exterior skin. All of these advantages can be realized with great flexibility by the provision of a relatively small number of standardized panel units. In conclusion, these advantages are realized in a structure which meets the peculiar requirements of mobile homes.

While there has been shown and described what is at present considered to be the preferred embodiment of the present invention, an embodiment which has been found in practical use and road test to accomplish the advantages claimed, it will be understood by those skilled in the mobile home art that various changes and substitutions of equivalents may be made in the practice of the above teachings. Accordingly, I desire in the appended claims to secure a proper range of equivalents.

Having disclosed my invention, I claim:

1. In mobile home construction the combination of a plurality of individually reinforced side panel units each comprising a single rectangular interior plywood panel and waterproof-bonded exterior wood rails on each side and exterior cross rails at each end and at least one intermediate exterior cross rail, a plurality of individually reinforced roof panel units each comprising a single rectangular plywood interior panel extending over the width of the home and waterproof-bonded exterior wood rails on each side and exterior cross rails at each end and at least one intermediate exterior cross rail, adjacent panel edges being in abutment, adjacent side rails being grooved, clamps and splines for securing adjacent side rails to each other to form interlocks, said panels being so dimensioned that roof panel interlocks are displaced from and out of registry with side panel interlocks, whereby one end of each side panel interlock is disposed adjacent a roof panel unit cross rail and one end of each roof panel interlock is disposed adjacent a side panel unit cross rail to form a rigid exterior framework structure with a continuous plywood interior.

2. In mobile home construction, the combination in accordance with claim 1 in which the side edges of the rectangular roof and side panels are partially beveled and abut in continuity to form grooved interior surfaces.

3. In mobile home construction, the combination in accordance with claim 1 in which horizontal ports are formed adjacent the panels in the cross rails of the roof panel units to discharge moisture.

4. In mobile home construction, the combination in accordance with claim 1 in which ports are formed adjacent the panels in the side rails of the roof panels to discharge moisture.

5. In mobile home construction, the combination in accordance with claim 1 in which ports are formed adjacent the panels of the side and cross rails of the roof panels to discharge moisture.

6. In mobile home construction in accordance with claim 1, the combination in which the roof is bowed convex upward and in which horizontal ports are formed in the cross rails of the roof panel units to discharge moisture, at least some cross rails of the side panel units being tapered downwardly and outwardly to shed moisture.

7. In mobile home construction the combination of a plurality of side panel units each comprising a single rectangular plywood interior panel and bonded exterior wood rails on each side of the panel and bonded exterior cross rails at each end, a plurality of roof panel units each comprising a single rectangular plywood interior panel coextensive with the width of the home and bonded exterior wood rails on each side and bonded exterior cross rails at each end, adjacent panel edges being in abutment, adjacent side rails being grooved, splines for securing adjacent side rails to each other by fitting in their grooves to form interlocks, means for clamping adjacent side rails together, said panels being so dimensioned that roof panel interlocks are displaced from and out of registry with side panel interlocks, whereby one end of each side panel interlock is disposed adjacent a roof panel unit cross rail and one end of each roof panel interlock is disposed adjacent a side panel unit cross rail to form a rigid structure with an interior plywood ceiling and walls and with the rails forming the entire top and side exterior framework, and a metallic skin secured to said framework.

8. In mobile structure construction the combination of a plurality of side panel units each comprising a single rectangular plywood interior panel and bonded exterior wood rails on each side of the panel and bonded exterior cross rails at each end, a plurality of roof panel units each comprising a single rectangular plywood interior panel coextensive with the width of the structure and bonded exterior wood rails on each side and bonded exterior cross rails at each end, adjacent panel edges being in abutment, adjacent side rails being grooved, splines for securing adjacent side rails to each other by fitting in their grooves to form interlocks, and means for clamping adjacent side rails together, said panels being so dimensioned that roof panel interlocks are displaced from and out of registry with side panel interlocks, whereby one end of each side panel interlock is disposed adjacent a roof panel unit cross rail and one end of each roof panel interlock is disposed adjacent a side panel unit cross rail to form a rigid structure with an interior plywood ceiling and interior walls and with the rails constituting the entire top and side exterior framework.

9. In mobile home construction the combination of a plurality of side panel units each comprising a single rectangular plywood interior panel and bonded exterior wood rails on each side of the panel and bonded exterior cross rails at each end, a plurality of roof panel units each comprising a single rectangular plywood interior panel coextensive with the width of the home and bonded exterior wood rails on each end, adjacent panel edges being in abutment, adjacent side rails being grooved, splines for securing adjacent side rails to each other by fitting in their grooves to form interlocks, and means for clamping adjacent side rails together so that the rails form the entire top and side exterior framework of a rigid structure with an interior plywood ceiling and walls.

References Cited in the file of this patent

UNITED STATES PATENTS

| Number | Name | Date |
|---|---|---|
| 668,720 | Siegmund | Feb. 26, 1901 |
| 1,289,308 | Thornton | Dec. 31, 1918 |
| 1,801,137 | Brun | Apr. 14, 1931 |
| 2,022,869 | Reid | Dec. 3, 1935 |
| 2,235,662 | Arehart | Mar. 18, 1941 |
| 2,268,907 | Scott | Jan. 6, 1942 |
| 2,326,318 | Anderson | Aug. 10, 1943 |
| 2,376,854 | Saunders | May 22, 1945 |
| 2,378,275 | Williamson | June 12, 1945 |
| 2,403,318 | Weseman | July 2, 1946 |
| 2,453,326 | Lambert | Nov. 9, 1948 |
| 2,542,859 | Clements | Feb. 20, 1951 |
| 2,587,871 | May et al. | Mar. 4, 1952 |
| 2,599,994 | Hirsch | June 10, 1952 |
| 2,803,856 | Kofahl et al. | Aug. 27, 1957 |